Oct. 9, 1928.
A. HAUSER ET AL
1,686,694
GAUGING MACHINE
Filed March 28, 1927
4 Sheets-Sheet 1
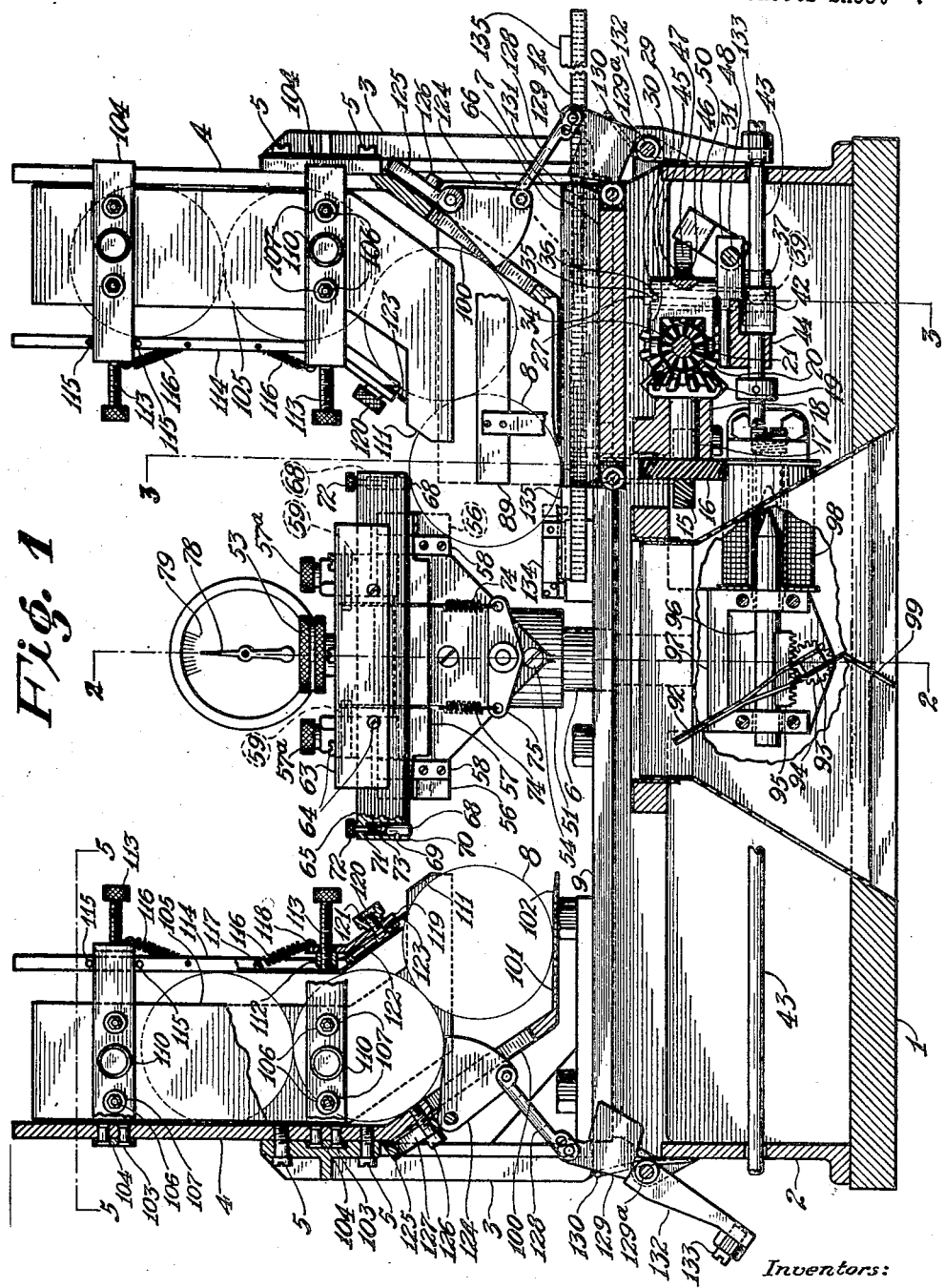
Inventors:
Alois Hauser
and Philip Wallin
by Carr & Carr & Gravely
their Attorneys.

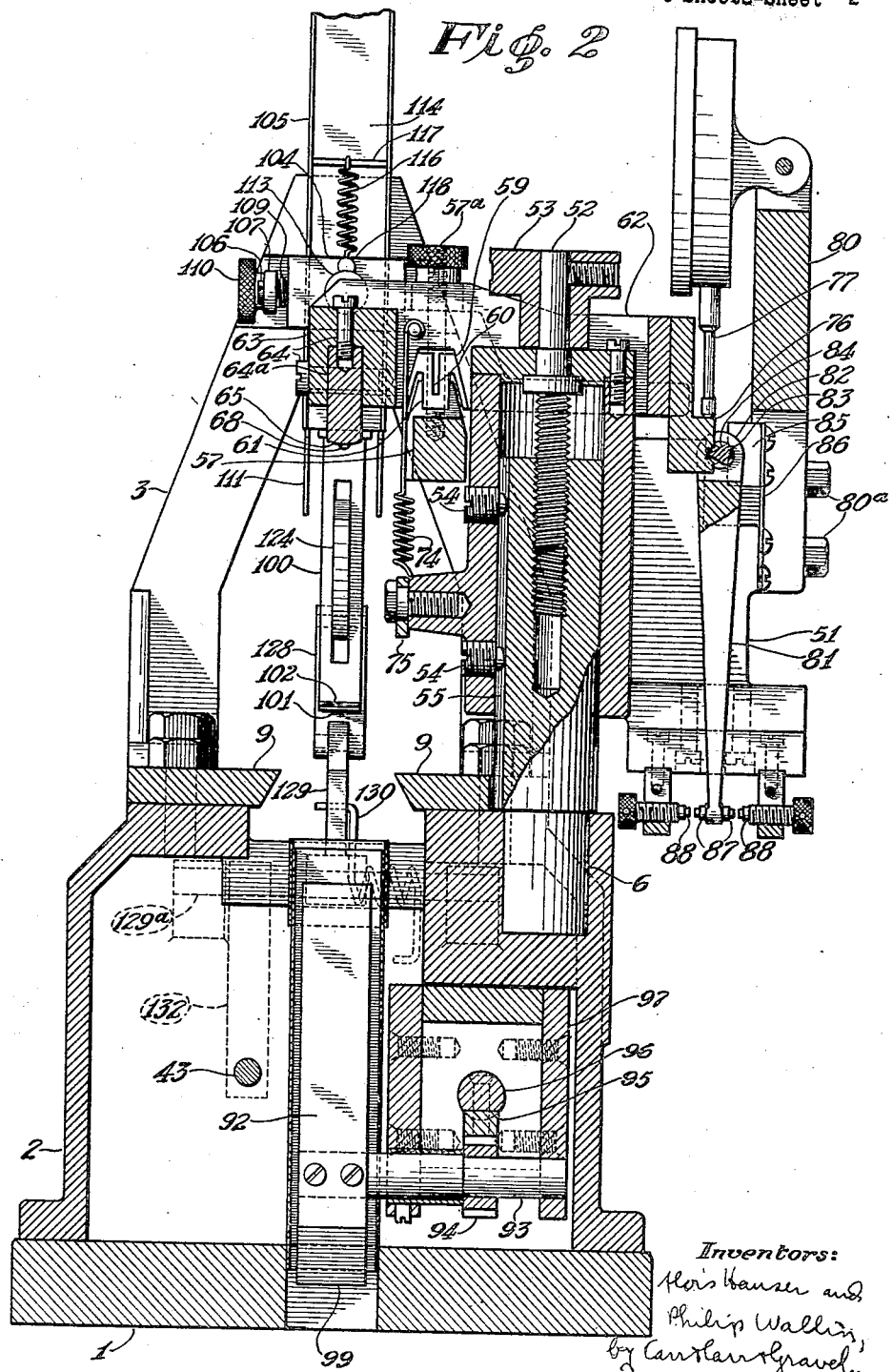

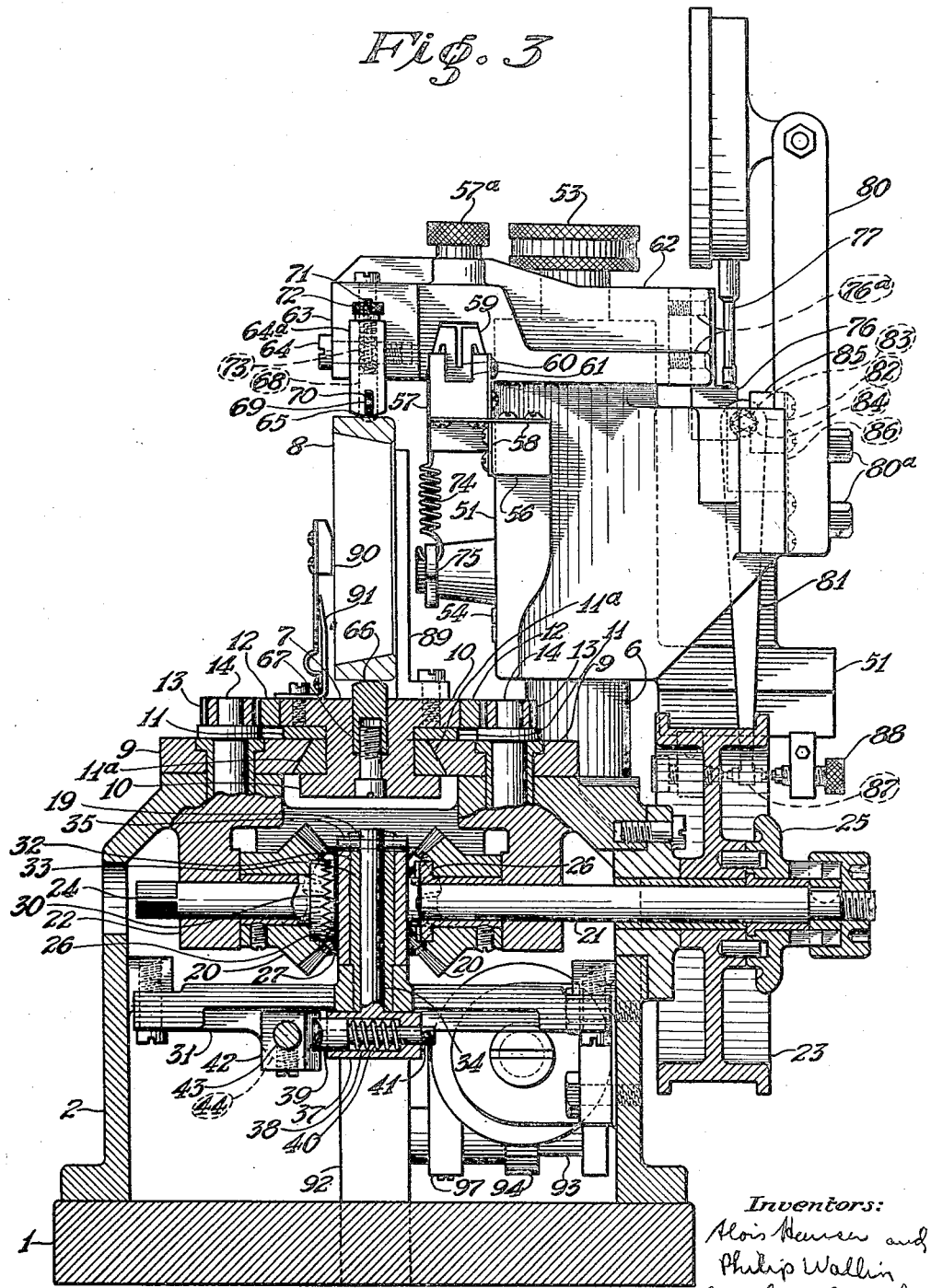

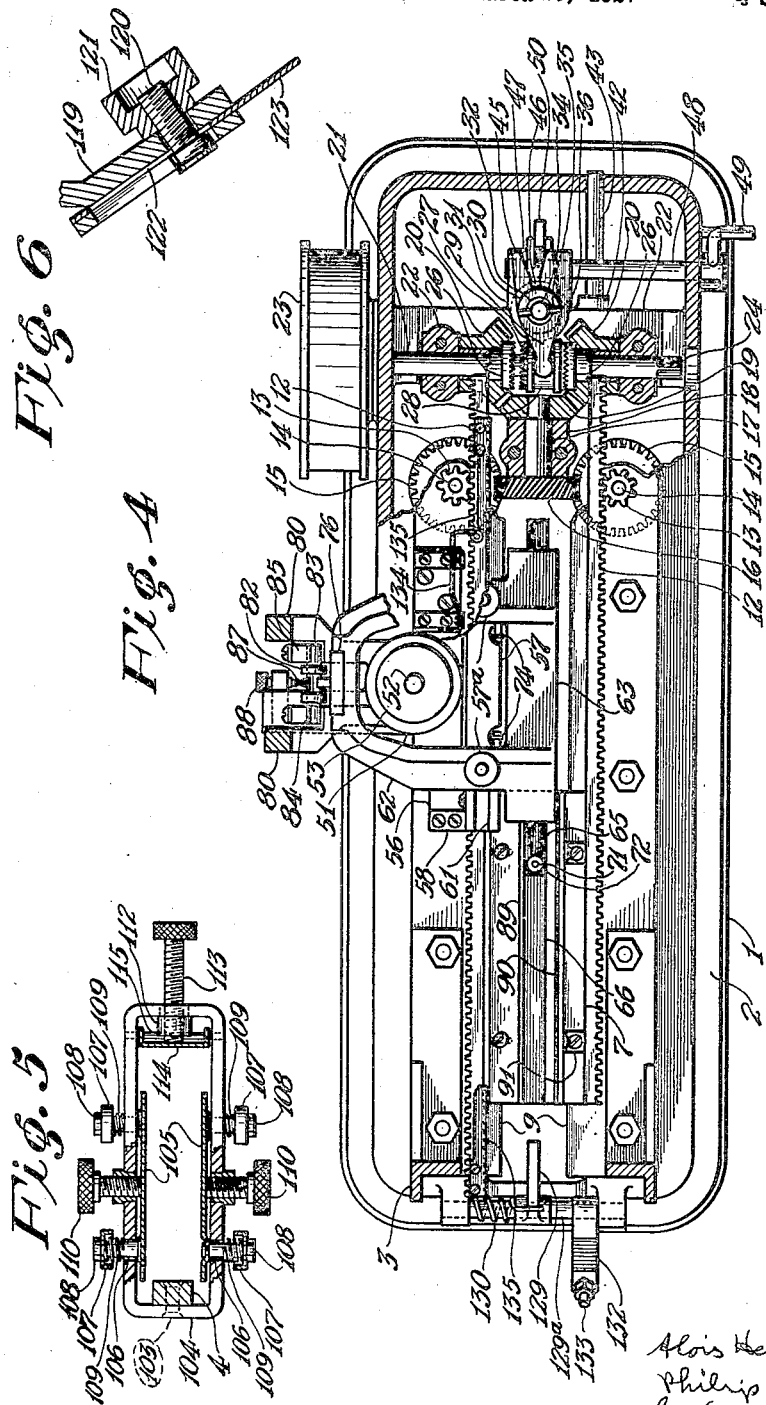

Patented Oct. 9, 1928.

1,686,694

UNITED STATES PATENT OFFICE.

ALOIS HAUSER AND PHILIP WALLIN, OF CANTON, OHIO, ASSIGNORS TO THE TIMKEN ROLLER BEARING COMPANY, OF CANTON, OHIO, A CORPORATION OF OHIO.

GAUGING MACHINE.

Application filed March 28, 1927. Serial No. 178,909.

Our invention relates particularly to machines for gauging articles for roundness of their periphery; but it may also be used to gauge the outside diameter of such articles. The invention has for its principal object a machine that will automatically and accurately gauge round articles, such as the outer race members of roller bearings and separate truly circular articles from those that are of imperfect circularity. The invention consists principally in an automatic mechanism for rolling a bearing cup or other circular object between two parallel straight edges or the like, one of which is resiliently mounted and operatively connected with a gauging device and assorting mechanism. The invention further consists in the gauging machine and in the parts and combinations and arrangements of parts hereinafter described and claimed.

In the accompanying drawing wherein like reference numerals indicate like parts wherever they occur, Fig. 1 is a part elevation, part longitudinal sectional view of a gauging machine embodying our invention;

Fig. 2 is a cross-sectional view thereof on the line 2—2 of Fig. 1;

Fig. 3 is a cross-sectional view on the line 3—3 of Fig. 1;

Fig. 4 is a plan view with some parts broken away;

Fig. 5 is a sectional view on the line 5—5 of Fig. 1, showing the feed chute; and Fig. 6 is a detail sectional view on an enlarged scale showing a spring member that engages a cup at the bottom of the feed chute.

It is common practice in gauging the circularity of circular objects such as the cups or outer race members of roller bearings, to use a gauge having a base on which the cup rests and a contact plunger or lever engaging said cup and operatively connected with a pointer or indicating finger. The outside diameter of the cup is indicated by the location of the pointer on the indicator scale. The cup is rotated and any deviation from true circularity of the outer surface is indicated by movement on the part of the indicator finger. Cups that vary more than a predetermined amount from true circularity must be discarded, as the requirements of roller bearing cups are such that only small variations from true circularity are permissible. This gauging operation is ordinarily a tedious manual operation and errors of judgment or observation on the part of the operator result in failure to discard cups that are unsatisfactory, and result in much difficulty in later stages of manufacture or in the use of the finished bearing. On the other hand, a slip of the hand of the operator in rotating the cup in the gauge may cause bodily movement of the cup instead of mere rotation, thus causing a movement of the pointer that will result in the discarding of a cup that is in fact of true circularity.

The present invention makes both the gauging and the assorting operations automatic and eliminates the foregoing disadvantages of manual gauging.

Mounted on a suitable base 1 is a housing 2 at the ends of which are mounted brackets 3. To each bracket is secured a feed chute member 4 as by screws 5. A column 6 on which is mounted gauging mechanism and a longitudinally movable carriage 7 adapted to receive a cup 8 or other circular object, first from one of said chutes 4 and then from the other and carry said cup into position to be gauged by said gauging mechanism are also mounted on said housing. Said housing 2 also contains suitable mechanism for operating said carriage 7 and for separating cups 8 of true circularity from those of imperfect circularity, all of which mechanism will be described hereinafter.

The carriage 7 is disposed between guides 9 provided therefor on the housing. The carriage 7 preferably has portions 10 at the top and bottom that overhang said guides 9, and bearing strips 11 may be interposed between the guides 9 and the under surfaces of the upper projecting portions 10 of said carriage 7. Bearing strips 11ª may be interposed between the body of the carriage and the sides of said guides 9.

Secured to the carriage 7 along each side thereof is a rack 12. Each rack 12 is driven by means of a pinion 13 that is mounted on a vertical shaft 14 at the lower end of which is a spiral gear 15. Said spiral gears 15 mesh with a gear 16 interposed therebetween and secured to a shaft 17 mounted in a suitable bearing member 18 in said housing 2. At the other end of said shaft 17 is a miter gear 19 that meshes with miter gears 20 loosely mounted on a shaft 21 that is mounted in suitable bearings 22 in the housing and provided with a pulley wheel 23 at one end for power drive. The other end 24 of said shaft 21 may be squared to permit manual rotation thereof by means of a crank. A clutch 25 is provided for the pulley wheel 23, to be disengaged when the shaft 21 is rotated by hand.

Each of said miter gears 20 is provided with a clutch member 26 adapted to cooperate with a clutch member 27 interposed between said gears 20 and keyed to the shaft 21, whereby it rotates with the shaft but is free to move longitudinally thereof. Thus the direction of rotation of the miter gear 19 and the direction of movement of said racks 12 and carriage 7 may be changed by means of said clutch mechanism. Said clutch member 27 is provided with a groove 28 in which are disposed the arms 29 of an oscillatable operating head 30 that rests on a supporting plate 31 mounted in the housing 2. Said operating head 30 has a bore 32 therethrough in which is a bushing 33. Disposed in the bushing 33 is a pivot pin 34 that is secured in position, as by a key 35 resting in notches 36 in the operating head. Said pin extends through said support 31 and has an enlarged lower end portion 37 that has a bore 38 in which is a plunger 39 against whose head works a spring 40 disposed in said bore. A pin 41 in the projecting end of said plunger 39 prevents it from being forced out of its mounting by said spring 40. Said plunger 39 has a beveled end that cooperates with a cam 42 on a rod 43 that is mounted in the bore of a boss 44 depending from said supporting plate 31 and that projects through the housing at each end. By moving said rod end wise said mounting pin 34 is turned by the engagement of said cam 42 with said plunger 39 and the mounting pin by means of its slot and pin connection with said operating head 30 turns said head to operate the clutch 27. The engagement of the spring pressed plunger 39 with the cam 42 on said rod 43 holds the clutch member 27 in mesh with either gear clutch member 26. The operating head 30 has a projecting portion 45 in which is a recess 46 having a flaring mouth 47. A rock shaft 48 mounted in said supporting plate and extending through the housing has a handle 49 and has an arm 50 that may be swung into said recess. As said arm rides over an inclined wall of the mouth 47 it swings the head 30 so that the clutch 27 is in neutral position and when said arm 50 is seated in the bottom of the slot 46 the clutch 27 is locked in neutral position.

Slidably mounted on the column 6 is a hollow gauging head 51 that is provided with a screw 52 that is free to rotate but held against longitudinal movement with respect to said head 51 and fits in a threaded bore in said column 6. Thus the gauging head 51 may be raised or lowered by turning a knurled head 53 secured to the end of said screw 52. The gauging head 51 is preferably provided with set screws 54 that fit in a longitudinal slot 55 in said column 6, whereby the head 51 is held against rotation relative to said column 6. Said head 51 has projecting arm portions 56 at the top thereof and a bar 57 has its ends secured to said projecting portions 56 of the gauging head as by means of crossed flat springs 58. Thus the bar 57 is permitted a slight rocking movement but is held against other movement.

Secured to said bar 57, as by means of screws 57ª and resting on resilient wedge members 59 or expanders having shanks 60 disposed in slots 61 at each end of the bar 57 is a hanger frame 62. Said frame 62 has an end portion 63 that is disposed over the path of travel of the carriage 7 and mounted in a slot 64ª in said frame 62 as by screws 64 is a straight edge or contact bar 65 that is adapted to cooperate with a straight edge or contact bar 66 secured in a longitudinal slot in said carriage 7 as by screws 67. A contact plunger 68 is mounted in each end of the upper contact bar 65. Each plunger 68 has a pin 69 that rides in a slot 70 in said contact bar 65, thus preventing the plunger 68 from turning. Each plunger 68 has a threaded extension 71 to which is secured a nut 72, whereby the position of the plunger may be adjusted. A spring 73 in said contact bar presses against the head of each plunger 68 to force it outwardly and into engagement with the work.

By raising or lowering the frame 62 on the wedge members 59 by means of said screws 57ª the hanger frame 62 may be adjusted so that the upper contact bar 65 is exactly parallel with the lower contact bar 66. Springs 74 secured to said hanger frame 62 and to an arm 75 mounted on the gauging head 51 pull down on the hanger frame 62, thus holding the upper contact bar 65 in engagement with the work 8.

The hanger frame 62 is provided with a contact block 76 secured thereto as by screws 76ª and adapted to engage the plunger or lever 77 of a suitable indicating device including a pointer 78 and a graduated scale 79. Said indicating mechanism is mounted on an upright 80 secured to the gauging head 51 as by screws 80ª.

Interposed between said gauging head 51 and said contact block 76 of the hanger frame is an elongated lever 81. Preferably said lever 81 has bifurcated upper end portions 82 in which is secured a fulcrum pin 83 having knife edges 84 disposed in V-slots in said contact block 76 and in a block 85 yieldably secured to said gauging head 51, as by a spring 86. The lower end of said lever 81 is provided with contact points 87 and is disposed between contact points 88 adjustably mounted on the gauging head 51 of the machine. Said contact points 88 are in an electrical circuit (not shown in the drawings) whereby if the lever 81 is thrown far enough to contact with one or the other contact point 88, an electric circuit is closed and an ejecting device (hereinafter described) is thereby operated to discard the defective article.

A cup 8 is held on the lower contact bar 66 by means of an upstanding plate or back stop 89 and a strip 90 mounted on springs 91 secured to the carriage 7. As the carriage 7 moves past the gauging head 51, a cup 8 thereon is rotated between the two contact bars 65 and 66. The size of the cup 8 and the circularity thereof are indicated on the scale 79 of the indicating device. When the carriage 7 moves completely past the gauging head 51, the cup 8 thereon drops off the end of the carriage 7 as the carriage continues its travel. The cup 8 falls on to a gate 92 that is mounted in the housing 2. If the cup is of true circularity, the gate remains in the position shown in Fig. 1 in the drawings and the cup drops to the right.

The gate 92 is mounted on a rock shaft 93 to which is secured a pinion 94 that meshes with a rack 95 mounted on a solenoid bar 96 that is slidable in a suitable support 97. The winding 98 of said solenoid device is in an electric circuit that is closed or energized by the movement of said lever 81 far enough for either of its contact points 87 to engage one of the contact points 88 in the housing. The energization of the solenoid winding 98 by reason of an out of round cup operating said lever 81 attracts the solenoid 96 and rocks the shaft 93 on which the gate 92 is mounted; so that the defective cup will be deflected to the left. Said gate 92 is provided with a projection 99 at the end that is engaged by a defective cup, which causes swinging of the gate, rotation of its shaft 93 and the resetting of the solenoid bar 96 and the gate 92 to the positions shown in Fig. 1.

Each chute member 4 is provided with a sloping portion 100 near the lower end and with a horizontal lower end portion 101 whose tip 102 is preferably beveled so as to permit a cup 8 to roll onto the carriage 7 with little jar. Secured to each chute member 4 as by bolts or rivets 103 are substantially rectangular frames 104 that support other parts of the feed chute. Elongated plates 105 that constitute side walls of the chute are suspended from said supporting frames 104 by pins 106 secured to said side plates 105 and passing through holes in said supporting frames 104. On each pin 106 is mounted a recessed washer 107 that is held by means of a nut 108. Interposed between each washer 107 and the supporting frame 104 is a spring 109 that is coiled around the pin 106 and forces the plate 105 toward the frame 104. In each side of each frame 104 is a screw 110 that serves as an abutment for a side plate 105. The positions of the side plates may be changed by turning said abutment screws. The lower end portion of each side plate 105 slopes in conformity with the back plate 4 and terminates in a guide tip 111 that supports a cup as it rests on the end 101 of said back plate. In the end of each frame 104 is an interiorly threaded bushing 112 in which is disposed a screw 113 whose end abuts against the base portion of a channel shaped member 114 that is held in the upper frame 104 by means of pins 115 in the flanges of the channel above and below said frame. Springs 116 secured to pins 117 in said channel member 114 and to screws 118 on said frames 104 pull the channel member 114 toward the ends of said frames 104. The position of the channel member 114 may be adjusted by turning said screw 113, thus enabling the chute to accommodate cups of different diameters.

The lower frame 104 is provided with an inclined depending portion 119 that is provided with a hole in which is disposed a screw 120 that is held in the projection 119 by an adjusting nut 121. Said screw 120 extends through a slot 122 in a flat spring 123 that engages a cup 8 in the bottom of the chute. Said spring 123 is strong enough to hold one cup 8 in position but is not strong enough to withstand the pressure of a plurality of cups in the chute.

An escapement lever 124 is disposed in the lower portion of each chute and adapted to normally engage the cup next to the bottom of the chute. Each lever is pivotally secured to a plate 125 that is secured to said bracket 3, as by a headed screw 126 passing through a slot 127 in said plate and into said bracket 3. Each escapement lever 124 is pivotally secured to a link 128 that is also pivotally secured to a trip plate 129 that is mounted on a pin 129ª in the housing whereby it may swing. A spring 130 on said pin engages the housing and the trip plate and normally holds the parts so that the escapement lever is in engagement with a cup, as shown at the left side of Fig. 1. Said trip plate 129 is adapted to be engaged by a roller 131 mounted on the end of the carriage at the end of the travel of said carriage. This action withdraws the escapement lever 124, permitting the lowermost cup 8 to move on to the carriage 7 and the other cups to drop down in the chute, as shown at the right side of Fig. 1.

Secured to the pivot pin 129ª of said trip member 129 is an arm 132 that has a contact screw 133 mounted at the end thereof adapted to engage the rod 43 that actuates the clutch 27 of the carriage drive mechanism. Thus when the carriage 7 reaches each end of its travel the engagement thereof with the corresponding trip member 129 causes the reversal of the clutch mechanism and the reversal of the movement of the carriage.

When a gauged cup 8 drops off the carriage, 7, the upper contact bar 65 drops down, causing the lever 81 to swing and make contact with a contact point 88. In order to avoid closing of the electric circuit except when a cup is being gauged, an auxiliary switch 134 is mounted on the housing. Near each end of one rack 12 is a block 135 adapted to engage the movable spring arm of said switch and thus open said switch after a cup has been gauged and before it drops off the carriage. This prevents closing of the electric circuit that operates the gate 92, except when a cup is actually being gauged.

The operation of the gauging device may be briefly described as follows: The feed chutes 4 are filled with cups 8 or other articles to be gauged, said chutes being filled automatically or by hand as may be desired. The main clutch 25 is then engaged and the carriage is caused to travel by means of the racks 12 and pinions 13. The carriage carries with it a cup, said cup being held on the lower gauge bar 66 between the back stop 89 and the spring pressed bar 90. The cup engages the contact plunger 68 in the end of the upper gauge bar 65 and forces said gauge bar upwardly so that the indicating pointer 78 indicates the diameter of the cup. As the carriage 7 continues to travel, the cup 8 rolls between the upper gauge bar 65 and the lower gauge bar 66 gradually working its way towards the rear end of the carriage 7. If the cup 8 is not truly circular, the upper gauge bar 65 will be moved sufficiently to cause the swinging lever 81 to contact with one or the other fixed contact points 88, thus closing the electric circuit and causing the solenoid 96 to be attracted, thereby setting the gate 92 in position to direct the cup into the container for defective articles. Just prior to the ejecting of the cup, one of the blocks 135 on the carriage opens the safety switch 134; so that the solenoid 96 will not be actuated when the upper gauge bar 65 drops. At the limit of its travel, the roller 131 at one end of the carriage 7 engages the trip plate 129, causing the escapement lever 124 to be lowered, thereby permitting the cups 8 in the feed chute to force the lowermost cup on to the carriage 7. The swinging of said trip plate likewise operates the clutch shifter rod 43 as above described reversing the clutch 27 and causes the travel of the carriage to be reversed. As soon as the carriage moves clear of the trip plate 129, the spring 130 causes said trip plate and the escapement lever 124 to return to normal position, with said escapement lever engaging the next to the bottom cup in the chute. The lowermost cup is lightly held by the spring 123.

The above described device automatically gauges circular articles for circularity and assorts articles of true circularity from defective articles. The machine is accurate and easy to operate. It indicates diameter as well as circularity. The assorting device may, if desired, be provided with two actuating circuits so as to separate oversized articles from undersized articles. Obviously numerous changes might be made without departing from the invention and we do not wish to be limited to the precise construction shown.

What we claim is:

1. A gauging machine comprising gauging mechanism, a carriage, means for supporting the work thereon, means for reciprocating said carriage so that work thereon may be gauged, said gauging mechanism being adapted and arranged to gauge work in each direction of movement of said carriage, and means actuated by said carriage for reversing the direction of travel of said carriage at each end of its path.

2. A gauging machine comprising gauging mechanism, a carriage, means for supporting the work thereon, means for reciprocating said carriage so that work thereon may be gauged, said gauging mechanism being adapted and arranged to gauge work in each direction of movement of said carriage, mechanism for feeding work to said carriage at each end of the path of travel thereof, and means actuated by said carriage for reversing the direction of travel of said carriage at each end of its path.

3. A gauging machine comprising a movable carriage, a gauge bar thereon, a back stop on said carriage adapted to support one edge of a circular object, a resiliently supported bar adapted to support the other edge of said circular object, a yieldably mounted gauge bar disposed parallel to said gauge bar on said carriage and means for moving said carriage so that a circular object thereon is rolled between said two gauge bars.

4. A gauging machine comprising a movable carriage, a gauge bar thereon, a back stop on said carriage adapted to support one edge of a circular object, a resiliently supported bar adapted to support the other edge of said circular object, a yieldably mounted gauge bar disposed parallel to said gauge bar on said carriage, means for moving said carriage so that a circular object thereon is rolled between said two gauge bars and drops from said carriage after being gauged, an assorting gate in position to receive an article dropping from said carriage, electrically controlled means for shifting said gate when a defective article is gauged, and means actuated by said carriage after an article has been gauged and before it drops from said carriage to render said electrical control inoperative, whereby said gate is shifted when a defective article is gauged and is not shifted when a correct article leaves said carriage.

5. A gauging machine comprising a gauging head and gauging mechanism carried thereby, a carriage bodily reciprocatable to carry work into position to be gauged, said gauging mechanism being adapted and arranged to gauge articles in each direction of movement of said carriage, reversible clutch mechanism for changing the direction of movement of said carriage, an operating plunger for said reversible clutch mechanism, a rod extending from end to end of the machine and having a cam adapted and arranged to operate said plunger and means actuated by said carriage at each end of its path to shift said rod endwise to actuate said plunger and reverse said cluch mechanism.

6. A gauging machine comprising a gauging head and gauging mechanism carried thereby, a carriage bodily reciprocatable to carry work into position to be gauged said gauging mechanism being adapted and arranged to gauge articles in each direction of movement of said carriage, spaced gears arranged to drive said carriage in opposite directions and each provided with a clutch portion, a clutch arranged to cooperate with said gear clutch portions selectively, an oscillatable hollow head for moving said clutch, a rod in said head, a pin in the top of said rod resting in notches provided therefor in said head, said rod having a projecting hollow bottom portion in which is disposed a spring pressed plunger, a rod extending from end to end of the machine and having a cam adapted and arranged to operate said plunger and means actuated by said carriage at each end of its path to shift said rod endwise to actuate said plunger and reverse said clutch mechanism.

7. A gauging machine comprising a gauging head and gauging mechanism carried thereby, a carriage bodily reciprocatable to carry work into position to be gauged, said gauging mechanism being adapted and arranged to gauge work in each direction of movement of said carriage, reversible clutch mechainsm for changing the direction of movement of said carriage, means for feeding work to said carriage at each limit of its movement, a rod extending from end to end of the machine, clutch shifting means operatively connected with said rod and means actuated by said carriage at each end of its path to shift said rod endwise to actuate said clutch shifting means and said work feeding means.

8. In a machine of the kind described, a feed chute having a vertical upper portion, an inclined portion and a horizontal lower end portion adapted to support a circular object, an escapement lever extending into said chute and adapted to support objects in said chute, gauging mechanism, a movable carriage for receiving an object, and means for withdrawing said escapement lever to permit an object to pass from the lower end portion of the feed chute onto said carriage.

9. In a machine of the kind described, a feed chute having a vertical upper portion, an inclined portion and a horizontal lower end portion adapted to support a circular object, an escapement lever extending into said chute and adapted to support objects in said chute, gauging mechanism, a movable carriage for receiving an object, and means actuated by said carriage for withdrawing said escapement lever to permit an object to pass from the lower end portion of the feed chute onto said carriage.

10. In a machine of the kind described, a feed chute having a vertical upper portion, an inclined portion and a horizontal lower end portion, a spring secured to said feed chute and adapted to hold a single circular object on the lower end portion of said chute, an escapement lever extending into said chute and adapted to engage an object next to the one on said lower end portion to support objects in the said upper portion of said chute, gauging mechanism, a movable carriage for receiving an object, and means for withdrawing said escapement lever to permit an object to pass from the bottom of the feed chute onto said carriage under pressure of the objects in said chute.

11. A gauging machine comprising a column, a gauging head adjustably mounted thereon, a supporting bar secured to said head so as to be free to rock vertically but held against endwise movement, a gauging frame adjustably secured to said supporting bar, a gauge bar secured to said frame and adapted to engage a circular object, springs secured to said frame and said head to hold said frame in lowermost position, an indicating device having a plunger adapted to cooperate with a portion of said frame, a block yieldably secured to said head, a lever interposed between said block and said frame and adapted to be moved as said frame is moved and assorting mechanism actuated by the movement of said lever.

12. A gauging machine comprising a column, a gauging head adjustably mounted thereon, a supporting bar secured to said head so as to be free to rock vertically but held against endwise movement, a gauging frame adjustably secured to said supporting bar, a gauge bar secured to said frame and adapted to engage a circular object, springs secured to said frame and said head to hold said frame in lowermost position, an indicating device having a plunger adapted to cooperate with a portion of said frame, a block yieldably secured to said head, a lever interposed between said block and said frame, said block and frame being provided with V-shaped depressions and said lever having knife-edge portions resting in said depressions, whereby said lever is adapted to be moved as said frame is moved and assorting mechanism actuated by the movement of said lever.

Signed at Canton, Ohio, this 22 day of March, 1927.

ALOIS HAUSER.
PHILIP WALLIN.